United States Patent [19]
Davis

[11] 4,318,320
[45] Mar. 9, 1982

[54] METHOD FOR REMOVING CAMBER FROM STRIP

[75] Inventor: Paul K. Davis, Alameda, Calif.

[73] Assignee: Pacific Roller Die Co., Inc., Hayward, Calif.

[21] Appl. No.: 205,235

[22] Filed: Nov. 10, 1980

Related U.S. Application Data

[62] Division of Ser. No. 961,758, Nov. 17, 1978, Pat. No. 4,255,999.

[51] Int. Cl.³ .............................................. B26D 7/26
[52] U.S. Cl. ........................................ 83/56; 83/35; 83/367; 83/420; 83/428; 83/445; 83/449; 409/138; 493/287
[58] Field of Search ................. 83/367, 420, 428, 438, 83/449, 445, 56, 35; 409/138; 493/287, 299

[56] References Cited

U.S. PATENT DOCUMENTS

| | | | |
|---|---|---|---|
| 2,705,049 | 3/1955 | Brooks | 83/56 X |
| 3,156,426 | 11/1964 | Brock | 83/367 |
| 3,257,906 | 6/1966 | Meville et al. | 409/138 |
| 3,610,493 | 10/1971 | Brocklehurst | 83/367 |
| 3,635,112 | 1/1972 | Johnson | 83/420 |
| 3,716,435 | 2/1973 | Jensen et al. | 493/287 |
| 3,731,571 | 5/1973 | Larson et al. | 83/420 |
| 3,774,491 | 11/1973 | Killilea | 83/428 |

*Primary Examiner*—Donald R. Schran
*Attorney, Agent, or Firm*—Ernest M. Anderson

[57] ABSTRACT

Method for removing camber from strip preparatory to forming helical pipe is taught utilizing the steps of feeding the strip longitudinally along a directional line of feed, sensing lateral deviations of the strip relative to the directional line of feed, laterally moving and re-aligning the strip in response to lateral deviations, then severing both side edges of the strip on lines parallel with the directional line of feed.

3 Claims, 7 Drawing Figures

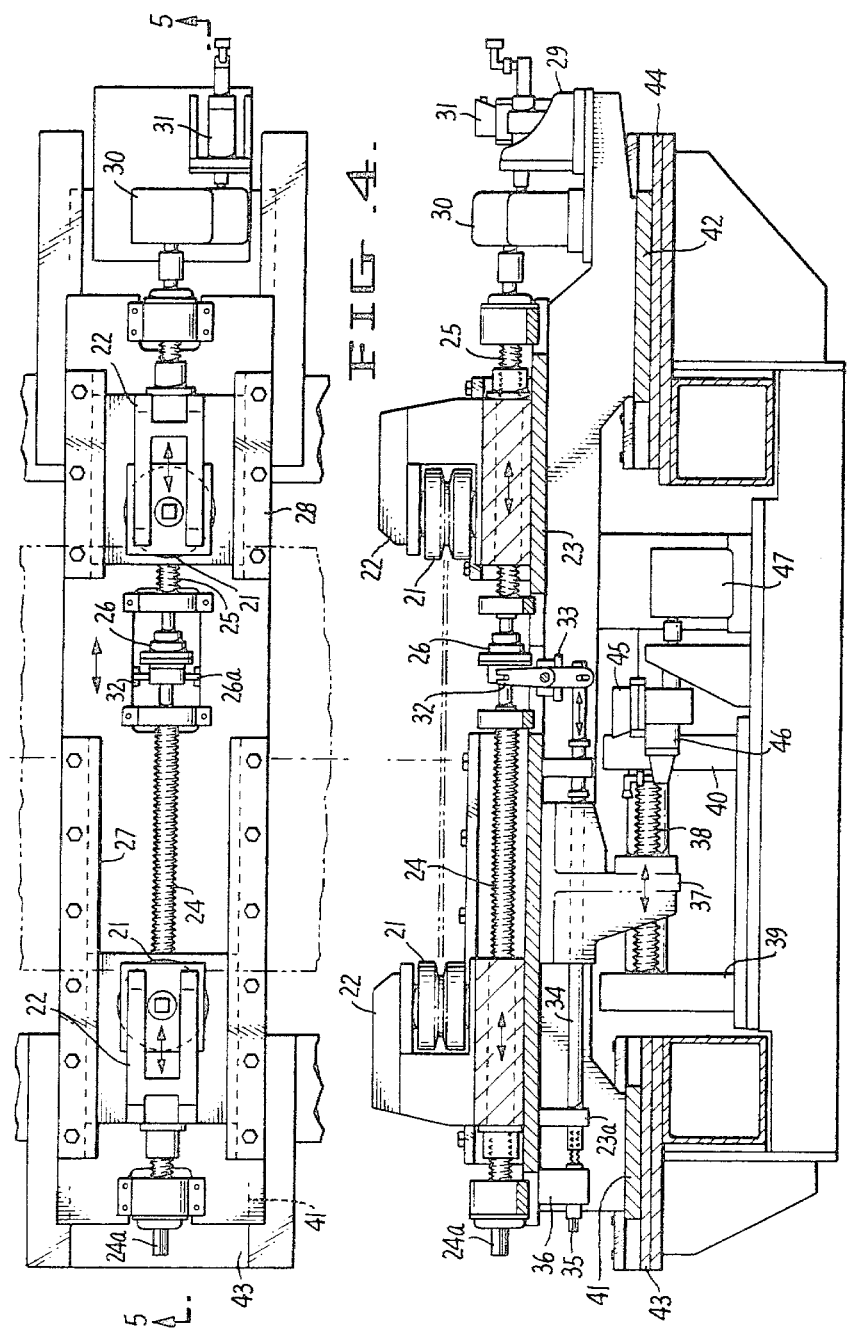

METHOD FOR REMOVING CAMBER FROM STRIP

This is a division of application Ser. No. 961,758, filed Nov. 17, 1978, now U.S. Pat. No. 4,255,999.

SUMMARY OF THE INVENTION

This invention relates to the manufacture of helical pipe and more particularly to the preparation of strip from which helical pipes are formed. Strip is conventionally supplied in large rolls of sheet material which varies dimensionally both in width and side edge linearity, an irregularity known as camber. Substantial variations in the width of the strip and the presence of camber often times cause serious difficulties in the manufacture of helical pipe and result in variations in pipe diameter. The problems associated with irregularities in strip width may be obviated by passing the strip through a slitter preparatory to forming the helical pipe, and this is a common practice in the industry. The slitter essentially trims one edge of the strip relative to the opposite edge, thereby producing a strip of uniform width dimension. However, whatever camber existed in the strip when received from the manufacturer remains in the strip even after it passes through the slitter.

The present invention, it will be understood, is primarily concerned with the problem of removing the camber from the strip preparatory to forming helical pipe. But the solution to that problem, as accomplished by the invention, is compatible with the production of strip having uniform width. In general, the invention teaches a novel method and apparatus wherein lateral movements of the strip are sensed relative to a given directional line of feed and the strip is guided while being passed through a slitter, severing both side edges of the strip on lines parallel with the directional line of feed.

It is a primary object of the present invention to provide a method and apparatus for removing camber from strip preparatory to forming helical pipe.

Another object of the invention is to provide a method for removing camber from strip by sensing the position of the strip relative to a directional reference line and laterally moving or shifting the strip to compensate for earlier lateral movements and, thus, reposition the strip relative to a slitter.

Another object is to provide a method and apparatus of the kind described that may be utilized with strip having variations in width and camber, the removal of camber simultaneously producing strip of a given uniform width.

Other objects of this invention will become apparent in view of the following detailed description.

In the drawings, forming a part of this application and in which like parts are identified by like reference numerals, FIG. 1 is a plan view and layout of apparatus for manufacturing helical pipe which includes a preferred embodiment of the invention;

FIG. 4 is a plan view of a preferred form of apparatus for guiding and positioning the strip relative to a slitter to accomplish the stated purposes of the invention.

FIG. 5 is an elevational view of the apparatus shown in FIG. 4;

Figures 1, 2, 3:
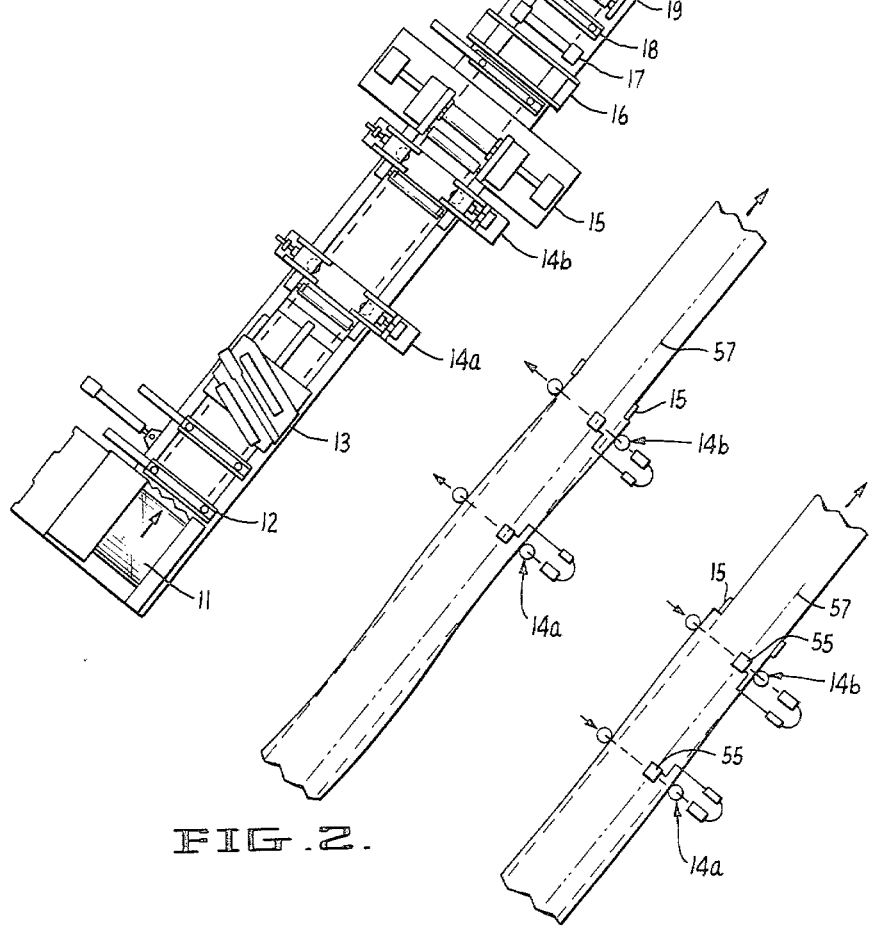
FIGS. 2 and 3 are plan views of a section of strip diagrammatically illustrating the manner in which camber is removed.

Referring to FIG. 1, there is shown one form of apparatus for forming helical pipe in combination with a preferred embodiment of the invention. Strip material supplied from a roll is fed from an uncoiler 11 through a strip guide 12, a strip welder 13, roll guides 14a and 14b, slitter 15, strip edge milling apparatus 16, edge bevelling apparatus 17, a main drive stand 18, a strip exit guide 19 and finally to a pipe-forming station 20. All of the foregoing apparatus is essentially conventional except for the roll guides 14a and 14b which position the strip relative to slitter 15.

In general, the present invention contemplates a method for removing camber from strip preparatory to forming helical pipe comprising the steps: feeding the strip longitudinally along a directional line of feed, sensing lateral deviations of the strip relative to the directional line of feed, laterally moving and realigning the strip in response to the sensed lateral deviations and, finally, severing the side edges of the strip on lines parallel with the directional line of feed. Lateral deviations of the strip are sensed by contacting the strip with objects, or by attaching objects to the strip, and then sensing lateral movements of the objects as the strip is advanced longitudinally.

In the preferred embodiment, lateral deviations of the strip are sensed in advance of slitter 15 at or proximate roll guides 14a and 14b; and objects capable of being sensed are applied to or placed in contact with the strip at each station. Lateral movements of the objects are then detected relative to a directional reference line passing through the point of application and extending parallel with the directional line of feed. The directional reference lines may be either coincident or parallel with each other.

Whenever lateral movements of objects applied to or in contact with the strip are sensed, the strip itself is physically moved laterally in the opposite direction to reposition the objects on the directional reference line or lines. Thus, the section of the strip located between the pair of longitudinally spaced objects being sensed is carefully positioned and fed through slitter 15 independently of strip camber or strip width.

Roll guides 14a and 14b each comprise a pair of guide rolls 21 rotatably mounted in a block 22, each pair of blocks being supported upon a table 23 and adapted for lateral movement toward and away from each other by means for varying the spacing between guide rolls. For this purpose, blocks 22 are mounted on a screw comprised of a pair of threaded members 24 and 25 coaxially connected by a detachable coupling 26. Threaded members 24 and 25 are oppositely threaded so that, upon rotation of the screw, blocks 22 will move either toward or away from each other. Movement of the blocks is also restricted and guided by a set of ways or runners 27 and 28.

Threaded member 25 connects to a hydraulic motor 29 through a gearbox 30. Control means comprising a servomechanism including a control valve 31 governs the operaion of the hydraulic motor to position guide rolls 21 with controlled spacing. But the spacing between guide rolls may be adjusted independently of the servomechanism.

Threaded member 24 may be rotated independently of threaded member 25 by engaging the end 24a with a crank (not shown) after first disconnecting coupling 26. This is accomplished with a decoupler mechanism comprising a bifurcated lever 32 pivoted to a support bracket 33. The upper end of lever 32 engages a pair of pins 26a forming a part of coupling 26. The lower end of lever 32 pivotally connects to a slidable rod 34 which is, in turn, supported by a pair of mounts 23a, 23b which project downwardly from beneath table 23. One end of rod 34 is threadedly engaged by a screw 35 rotatably mounted in a bracket 36. Rotation of screw 35, as by means of a crank (not shown), moves operating rod 34 axially as to pivot lever 32 and separate or join conjunctive parts of coupling 26.

Means is further provided for laterally moving table 23, including guide rolls 21 and other table-supported apparatus, as a unit. A pair of feet 41 and 42 support table 23 in runners 43 and 44, respectively. Both runners have bearing surfaces allowing the table to be laterally moved therein.

A bracket 37 secured to the underside of table 23 threadedly engages a screw 38 rotatably mounted between a pair of stanchions 39 and 40. A servomechanism responsive to lateral deviations of the strip is utilized for rotating screw 38 in one direction or the other. This mechanism includes a control valve 45 and a hydraulic motor 46 connected to screw 38 through a gearbox 47.

Figure 6:
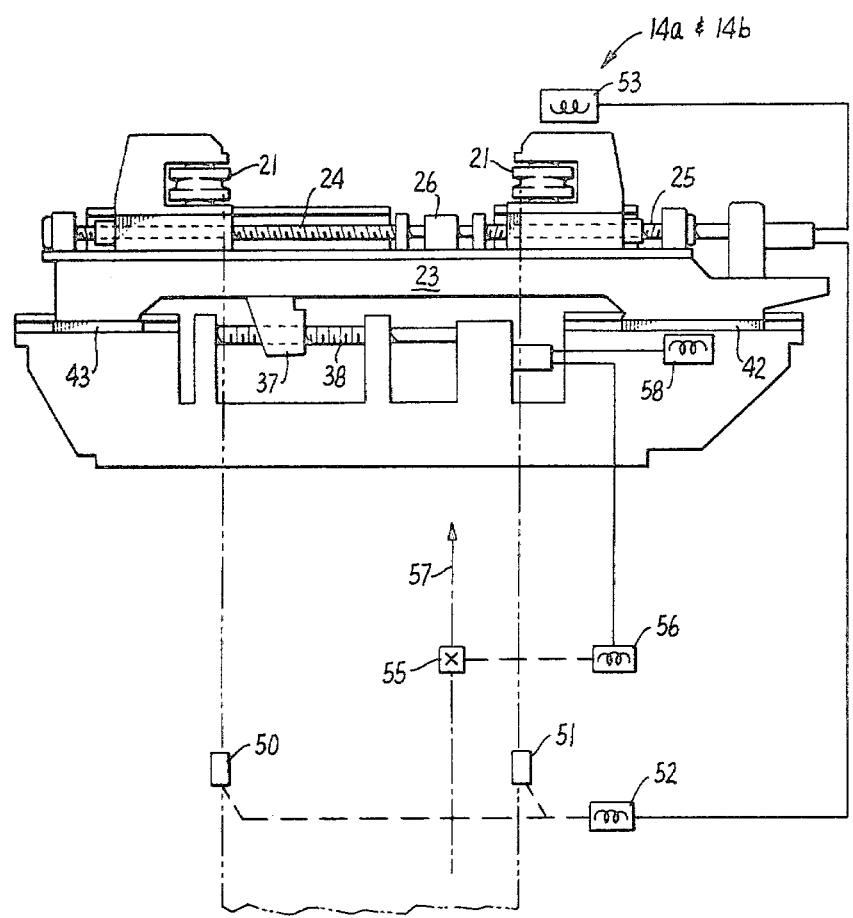
FIG. 6 is an elevation of the apparatus including a schematic of controls which govern its operation.
Figure 7:
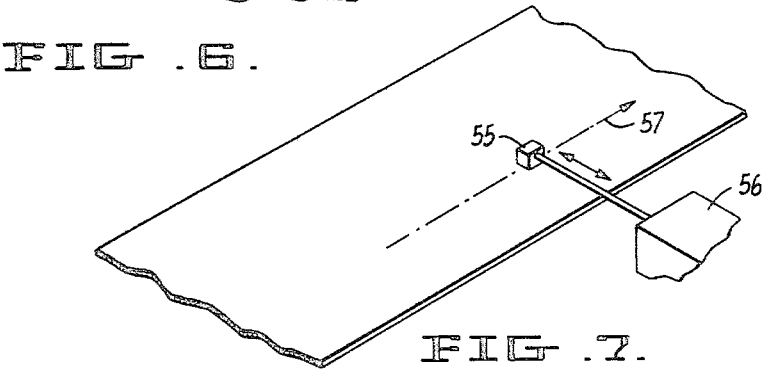
FIG. 7 is a perspective of one means for sensing lateral deviations of the strip.

Referring to FIG. 6, there is schematically shown a sensing means for detecting lateral movements of the strip relative to a directional line of feed between the uncoiler and slitter and control means responsive to the sensing means for moving rolls 21 laterally both together and independently. The spacing between rolls 21 is controlled by means of a feeler gauge comprised of a pair of contacts 50 and 51 which operate a linear voltage displacement transformer 52. The output of transformer 52 commands a position feedback transducer 53 forming a control for valve 31. A conventional servomechanism, such as a Moog series A084 servodrive, may be used for this purpose.

Contacts 50 and 51 are located upstream or in advance of the roll station which they control and in the preferred embodiment are located in close proximate relationship to the rolls 21 of that station. Nevertheless, certain time delays may be incorporated in the control circuitry allowing the contacts to be positioned substantially forward of the rolls.

The sensing means for detecting lateral movements of the strip relative to a directional line of feed comprises an object 55, such as a shoe or contact, engageable with the strip and a linear voltage displacement transformer 56. The contact or object 55 is initially applied to the strip on a directional reference line 57 but may be carried by the strip to positions on either side of that line as the strip is longitudinally advanced. Lateral movements of object 55 controls the output of transformer 56 which, in turn, commands a position feedback transducer 58 and the servomechanism for operating screw 38.

It is to be understood that the controls for operating servomechanisms 31 and 45 cooperate in positioning the strip relative to slitter 15; but both control mechanisms independently affect the position of guide rolls 21.

In operation, and assuming that the width of the strip remains constant, the position of rolls 21 would be solely dependent upon lateral deviations of objects 55 from the directional line of reference 57. Such lateral deviations would result if camber were present in that section of the strip between guide rolls 14a and 14b. The sensing of any such lateral deviations would evoke an immediate response and operation of the controlled servomechanism, causing table 23 and supported rolls 21 to be shifted and repositioning the strip until objects 55 again occupied a point on the directional line of reference 57.

In the preferred embodiment, objects 55 are placed in contact with or applied to the strip between the rolls 21 of roll guides 14a and 14b, as shown in FIGS. 2 and 3. Nevertheless, the objects may be applied either upstream or downstream of the roll guides but in close proximity thereto. However, if objects 55 are located and detected either substantially in advance or substantially downstream of the rolls, a repositioning of the strip by one roll guide may introduce substantial deviations of objects applied to the strip proximate to the other roll guide, thus resulting in an erratic behavior of the control mechanism.

It will be understood that various forms of sensing mechanisms may be utilized in connection with this invention for detecting lateral movements of the strip. The use of a wiper member or shoe placed in contact with the strip, as shown, is one expedient. However, more sophisticated forms of sensing mechanism may be utilized. It is contemplated, for example, that objects 55 may be applied magnetically to the strip (or by suction or adhesives) as with tracking mechanism shown and described in U.S. Pat. No. 3,747,446.

Although a preferred embodiment of the invention is illustrated and described, various modifications and changes may be resorted to without departing from the spirit of the invention or the scope of the appended claims, and each of such modifications and changes is contemplated.

What is claimed is:

1. A method for removing camber from strip preparatory to forming helical pipe, comprising:
   feeding the strip longitudinally along a directional line of feed contacting the surface of the strip between its lateral edges to sense lateral deviations of the strip relative to the directional line of feed, laterally moving and realigning the strip in response to lateral deviations, and severing the side edges of the strip on lines parallel with the directional line of feed.

2. A method for removing camber from strip preparatory to forming helical pipe comprising:
   feeding the strip longitudinally along a directional reference line, contacting the surface of the strip on said directional reference line with an object, sensing lateral deviations of the object relative to the directional reference line, laterally moving the strip to reposition the object on or proximate to the directional reference line, and severing the side edges of the strip on lines parallel with the directional reference line as said strip passes through a slitter station.

3. A method for removing camber from strip preparatory to forming helical pipe comprising:
   feeding the strip longitudinally along a pair of directional reference lines, said lines being parallel or coincident, contacting the surface of the strip on each directional reference line with an object, sensing lateral deviations of each object relative to the directional reference line to which it has reference, laterally moving the strip in a direction tending to reposition the objects on or proximate to the associated directional line, and severing the side edges of said strip on lines parallel with said pair of directional reference lines as said strip passes through a slitter station.

* * * * *